(12) United States Patent
Yu et al.

(10) Patent No.: US 6,387,172 B1
(45) Date of Patent: May 14, 2002

(54) GYPSUM COMPOSITIONS AND RELATED METHODS

(75) Inventors: Qiang Yu; Srinivas Veeramasuneni; Frederick Thomas Jones, all of Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/557,636

(22) Filed: Apr. 25, 2000

(51) Int. Cl.$^7$ .............................................. C04B 11/00
(52) U.S. Cl. ........................ 106/680; 106/772; 106/774
(58) Field of Search ............................... 106/680, 772, 106/774

(56) References Cited

U.S. PATENT DOCUMENTS

| | | | |
|---|---|---|---|
| 1,912,702 A | * | 6/1933 | Gamarra |
| 3,607,486 A | | 9/1971 | Jacks et al. |
| 3,616,173 A | | 10/1971 | Green et al. |
| 3,657,036 A | | 4/1972 | Mullenhoff et al. |
| 3,697,366 A | * | 10/1972 | Harlock et al. |
| 3,701,379 A | | 10/1972 | Fassler et al. |
| 3,895,593 A | | 7/1975 | Moore |
| 3,906,083 A | | 9/1975 | George |
| 3,915,888 A | | 10/1975 | Hoeppel |
| 3,947,284 A | | 3/1976 | Kitsugi et al. |
| 3,950,181 A | | 4/1976 | Pilgrim |
| 3,985,610 A | | 10/1976 | Pomerhn et al. |
| 4,019,918 A | | 4/1977 | Wills, Jr. |
| 4,021,259 A | | 5/1977 | Komatsu et al. |
| 4,029,512 A | | 6/1977 | Jaunarajs et al. |
| 4,057,433 A | | 11/1977 | Brown |
| 4,127,628 A | | 11/1978 | Uchida et al. |
| 4,152,078 A | | 5/1979 | Pilgrim |
| 4,153,373 A | | 5/1979 | O'Neill |
| 4,166,749 A | | 9/1979 | Sterrett et al. |
| 4,187,275 A | | 2/1980 | Bracalielly et al. |

(List continued on next page.)

FOREIGN PATENT DOCUMENTS

| | | |
|---|---|---|
| GB | 2 316 693 | 3/1998 |
| WO | WO 99/08978 | 2/1999 |

OTHER PUBLICATIONS

Mechanical Properties of Non–Metallic Brittle Materials, W.H. Walton, Ed. London (Apr. 1958) pp. 33–49.

King et al. "An Effective Sem–Based Image Analysis System for Quantitative Minerology" KONA Powder and Particle No. 11 (1993) pp. 164–177.

Rong et al. "Study on the Production Process and Properties of Aeration Gypsum Insulation Panel", pp. 1003–1008 (no date available).

"Standard Classification for Acoustically Absorptive Materials Applied by Towel or Spray" The American Society for Testing Materials (Designation: E 1042–92) pp. 814–823 (no date available).

*Primary Examiner*—Paul Marcantoni
(74) *Attorney, Agent, or Firm*—Leydig, Voit & Mayer, Ltd.; John M. Lorenzen; David F. Janci (57) ABSTRACT

A set gypsum composition and methods for the preparation thereof are disclosed. The set gypsum composition comprises a continuous phase of interlocking set gypsum matrix having an enhanced water voids volume and/or is prepared from a mixture (e.g., slurry) comprising an elevated ratio of water to calcined gypsum. Also disclosed is an article comprising the set gypsum composition.

88 Claims, 1 Drawing Sheet

U.S. PATENT DOCUMENTS

| | | | |
|---|---|---|---|
| 4,201,595 A | 5/1980 | O'Neill | |
| 4,222,984 A | 9/1980 | Ladwig | |
| 4,238,445 A | 12/1980 | Stone | |
| 4,238,546 A | 12/1980 | Phillips | |
| 4,264,543 A | 4/1981 | Valenta | |
| 4,265,672 A | 5/1981 | Walton et al. | |
| 4,265,964 A | 5/1981 | Burkhart | |
| 4,265,979 A | 5/1981 | Baehr et al. | |
| 4,272,137 A | 6/1981 | Rothhaas et al. | |
| 4,278,468 A | 7/1981 | Selbe et al. | |
| 4,286,995 A | 9/1981 | Smith et al. | |
| 4,321,077 A | 3/1982 | Schroeder et al. | |
| 4,327,146 A | 4/1982 | White | |
| 4,328,178 A | 5/1982 | Kossatz | |
| 4,330,589 A | 5/1982 | Saito et al. | |
| 4,350,736 A | 9/1982 | Reily | |
| 4,360,386 A | 11/1982 | Bounini | |
| 4,364,212 A | 12/1982 | Pearson et al. | |
| 4,382,809 A | 5/1983 | Porter et al. | |
| 4,392,896 A | 7/1983 | Sakakibara | |
| 4,405,468 A | 9/1983 | Haun, Jr. | |
| 4,424,197 A | 1/1984 | Powell et al. | |
| 4,436,204 A | 3/1984 | Sowinski | |
| 4,439,407 A | 3/1984 | Parks | |
| 4,443,260 A | 4/1984 | Miyoshi et al. | |
| 4,450,022 A | 5/1984 | Galer | |
| 4,465,518 A | 8/1984 | Miyoshi et al. | |
| 4,477,300 A | 10/1984 | Pilgrim | |
| 4,504,321 A | 3/1985 | Kapland et al. | |
| 4,539,121 A | 9/1985 | Kapland et al. | |
| 4,540,439 A | 9/1985 | Kurandt | |
| 4,552,683 A | 11/1985 | Powell et al. | |
| 4,558,552 A | 12/1985 | Reitter, II | |
| 4,601,832 A | 7/1986 | Hooykaas | |
| 4,634,498 A | 1/1987 | Hardesty et al. | |
| 4,680,907 A | 7/1987 | Williams | |
| 4,687,373 A | 8/1987 | Falk et al. | |
| 4,725,477 A | 2/1988 | Kole et al. | |
| 4,731,917 A | 3/1988 | Krowl | |
| 4,761,183 A | 8/1988 | Clarke | |
| 4,812,045 A | 3/1989 | Rivers | |
| 4,818,202 A | 4/1989 | Bevan et al. | |
| 4,820,053 A | 4/1989 | Rivers | |
| 4,820,754 A | 4/1989 | Negri et al. | |
| 4,822,425 A | 4/1989 | Burch | |
| 4,826,350 A | 5/1989 | Kambe | |
| 4,835,034 A | 5/1989 | Cruz | |
| 4,836,856 A | 6/1989 | Klco | |
| 4,856,240 A | 8/1989 | McHale | |
| 4,876,091 A | 10/1989 | Clarke, Jr. | |
| 4,879,173 A | 11/1989 | Randall | |
| 4,901,485 A | 2/1990 | Menchetti et al. | |
| 4,904,709 A | 2/1990 | Hermele | |
| 4,906,449 A | 3/1990 | Kosugi et al. | |
| 4,935,211 A | 6/1990 | Azar | |
| 4,942,003 A | 7/1990 | Bold | |
| 4,965,031 A | 10/1990 | Conroy | |
| 4,985,060 A | 1/1991 | Higa | |
| 4,997,357 A | 3/1991 | Eirich et al. | |
| 5,019,198 A | 5/1991 | Schäfer et al. | |
| 5,026,215 A | 6/1991 | Clarke | |
| 5,041,333 A | 8/1991 | Conroy | |
| 5,075,358 A | 12/1991 | Riley et al. | |
| 5,076,986 A | 12/1991 | Delvaux et al. | |
| 5,082,887 A | 1/1992 | Brown et al. | |
| 5,085,929 A | 2/1992 | Bruce et al. | |
| 5,086,850 A | 2/1992 | Harris et al. | |
| 5,104,715 A | 4/1992 | Cruz | |
| 5,110,361 A | 5/1992 | Alley et al. | |
| 5,116,671 A | 5/1992 | Bruce et al. | |
| 5,118,544 A | 6/1992 | Delvaux et al. | |
| 5,121,795 A | 6/1992 | Ewert et al. | |
| 5,123,487 A | 6/1992 | Harris et al. | |
| 5,125,455 A | 6/1992 | Harris et al. | |
| 5,127,473 A | 7/1992 | Harris et al. | |
| 5,133,806 A | 7/1992 | Sakamoto et al. | |
| RE34,020 E | 8/1992 | Briggs et al. | |
| 5,148,645 A | 9/1992 | Lehnert et al. | |
| 5,151,130 A | 9/1992 | Croft et al. | |
| 5,154,955 A | 10/1992 | Delvaux et al. | |
| 5,155,959 A | 10/1992 | Richards et al. | |
| 5,158,835 A | 10/1992 | Burke | |
| 5,167,710 A | 12/1992 | Leroux et al. | |
| 5,173,364 A * | 12/1992 | Geeraert | 428/312.4 |
| 5,227,100 A | 7/1993 | Koslowski et al. | |
| 5,228,808 A | 7/1993 | McKennon et al. | |
| 5,231,811 A | 8/1993 | Andrepont et al. | |
| 5,236,989 A | 8/1993 | Brown et al. | |
| 5,238,064 A | 8/1993 | Dahl et al. | |
| 5,250,588 A | 10/1993 | Delvaux et al. | |
| 5,264,057 A | 11/1993 | Schlatter et al. | |
| 5,277,856 A | 1/1994 | Bucking | |
| 5,298,173 A | 3/1994 | Burke | |
| 5,305,577 A | 4/1994 | Richards et al. | |
| 5,320,677 A | 6/1994 | Baig | |
| 5,330,691 A | 7/1994 | Geeraert | |
| 5,336,022 A | 8/1994 | McKennon et al. | |
| 5,342,566 A | 8/1994 | Schäfer et al. | |
| 5,347,780 A | 9/1994 | Richards et al. | |
| 5,384,004 A | 1/1995 | Schlatter et al. | |
| 5,397,631 A | 3/1995 | Green et al. | |
| 5,401,538 A | 3/1995 | Perito | |
| 5,422,015 A | 6/1995 | Angell et al. | |
| 5,501,719 A | 3/1996 | Shida et al. | |
| 5,516,974 A | 5/1996 | Sasae et al. | |
| 5,534,059 A | 7/1996 | Immordino, Jr. | |
| 5,543,186 A | 8/1996 | Andersen et al. | |
| 5,544,971 A | 8/1996 | Huege et al. | |
| 5,573,333 A | 11/1996 | Dahlman | |
| 5,614,206 A | 3/1997 | Randolph et al. | |
| 5,617,683 A | 4/1997 | Ney | |
| 5,631,312 A | 5/1997 | Takada et al. | |
| 5,637,362 A | 6/1997 | Chase et al. | |
| 5,643,510 A | 7/1997 | Sucech | |
| 5,644,880 A | 7/1997 | Lehnert et al. | |
| 5,683,616 A | 11/1997 | Cyrkiewicz et al. | |
| 5,696,174 A | 12/1997 | Chao et al. | |
| 5,704,179 A | 1/1998 | Lehnert et al. | |
| 5,714,001 A | 2/1998 | Savoly et al. | |
| 5,714,217 A | 2/1998 | Andersen et al. | |
| 5,718,797 A | 2/1998 | Phillips et al. | |
| 5,791,109 A | 8/1998 | Lehnert et al. | |
| 5,791,116 A | 8/1998 | Skintzis | |
| 5,807,567 A | 9/1998 | Randolph et al. | |
| 5,817,262 A | 10/1998 | Englert | |
| 5,836,135 A | 11/1998 | Hagan et al. | |
| 5,846,317 A | 12/1998 | Sattler et al. | |
| 5,871,857 A | 2/1999 | Alhamad | |
| 5,873,936 A | 2/1999 | Ogden | |
| 5,879,446 A | 3/1999 | Patel et al. | |
| 5,879,486 A | 3/1999 | Philips et al. | |
| 5,879,825 A | 3/1999 | Burke et al. | |
| 5,891,983 A | 4/1999 | Albrecht et al. | |
| 5,897,810 A | 4/1999 | Tamaura et al. | |
| 5,916,392 A | 6/1999 | Ghanbari | |
| 5,922,447 A * | 7/1999 | Baig | 428/292.7 |
| 6,001,496 A | 12/1999 | O'Haver-Smith | |

\* cited by examiner

GYPSUM COMPOSITIONS AND RELATED METHODS

TECHNICAL FIELD OF THE INVENTION

The present invention relates generally to gypsum compositions and methods for preparing gypsum compositions. More particularly, the invention relates to set gypsum compositions with reduced density and to methods for the preparation thereof.

BACKGROUND OF THE INVENTION

Set gypsum (calcium sulfate dihydrate) is a well-known material that is included commonly in many types of products. By way of example, set gypsum is a major component of end products created by use of traditional plasters (e.g., plaster-surfaced internal building walls) and also in paper-faced gypsum boards employed in typical drywall construction of interior walls and ceilings of buildings. In addition, set gypsum is the major component of gypsum/cellulose fiber composite boards and products, and also is included in products that fill and smooth the joints between edges of gypsum boards. Also, many specialty materials, such as materials useful for modeling and mold-making that are precisely machined, produce products that contain major amounts of set gypsum.

Typically, such gypsum-containing products are prepared by forming a mixture of calcined gypsum (calcium sulfate hemihydrate and/or calcium sulfate anhydrite) and water (and other components, as appropriate). The mixture is cast into a desired shape or onto a surface, and then allowed to harden to form set (i.e., rehydrated) gypsum by reaction of the calcined gypsum with water to form a matrix of crystalline hydrated gypsum (calcium sulfate dihydrate). It is the desired hydration of the calcined gypsum that enables the formation of an interlocking matrix of set gypsum crystals, thereby imparting strength to the gypsum structure in the gypsum-containing product. Mild heating is utilized to drive off the remaining free (i.e., unreacted) water to yield a dry product.

There is a continuing effort to make many such gypsum-containing products lighter in weight by substituting lower density materials (e.g., expanded perlite or air voids) for part of the set gypsum matrix, for example, in order to enhance acoustical and/or insulation properties as well as handling and transportation efficiencies. However, previous efforts for making gypsum-containing products substantially lighter have not been fully satisfactory because, for example, while significant amounts of foam can be utilized to produce the void content sufficient to achieve lower density gypsum-containing products, such products may, for example, still not achieve the desired level of acoustical and insulating properties. As a result, production of lower density gypsum-containing products has been susceptible to possible adverse effects caused by the relatively high amount of foaming agents provided, while still not achieving results desired in some cases. More recently, gypsum board formed from fibrous calcined gypsum has been disclosed in U.S. Pat. No. 5,041,333. The preparation of fibrous calcined gypsum is time consuming and expensive, thereby making the use of fibrous calcined gypsum to make gypsum board expensive, as well.

Another problem with forming a substantially lower density gypsum-containing product is that dimensional stability can be compromised during its manufacture, processing, and commercial application. For example, in the preparation of set gypsum products, there is usually a significant amount of free (i.e., unreacted) water left in the matrix after the gypsum has set. Upon drying of the set gypsum in order to drive off the excess water, the interlocking set gypsum crystals in the matrix tend to move closer together as the water evaporates. In this respect, as the water leaves the crystal interstices of the gypsum matrix, the matrix tends to shrink from natural forces of the set gypsum that were resisting capillary pressure applied by the water on the gypsum crystals. As the amount of water in the aqueous calcined gypsum mixture increases, lack of dimensional stability becomes more of a problem.

Dimensional stability is also of concern even after the final dried product is realized, especially under conditions of changing temperature and humidity where set gypsum is susceptible to, for example, expansion and shrinkage. For example, moisture taken up in crystal interstices of a gypsum matrix of a gypsum board or tile exposed to high humidity can aggravate a sagging problem by causing the humidified board to expand.

If such dimensional instability could be avoided or minimized, various benefits would result. For example, existing gypsum board production methods would yield more product if the boards did not shrink during drying, and gypsum-containing products desired to be relied upon to hold a precise shape and dimensional proportions (e.g., for use in modeling and mold making) would serve their purposes better.

Accordingly, it will be appreciated from the foregoing that there is a need in the art for a set gypsum composition exhibiting low density without requiring the need to include large amounts of lightweight filler or air voids created by foam. It will be appreciated also that there is a need in the art for such a set gypsum composition of lower density that exhibits enhanced dimensional stability, insulation, and/or acoustical properties. The invention provides such a set gypsum composition and method for the preparation thereof. These and other advantages of the present invention, as well as additional inventive features, will be apparent from the description of the invention provided herein.

BRIEF SUMMARY OF THE INVENTION

The present invention provides a set gypsum composition and methods for the preparation thereof. Advantageously, the set gypsum composition of the invention is of low-density and demonstrates enhanced dimensional stability (e.g., resistance to shrinkage), insulation, and/or acoustical properties.

In one aspect, the present invention provides a gypsum composition prepared by a method comprising forming a mixture using at least calcined gypsum and water. Desirably, the ratio by weight of water to calcined gypsum used to prepare the mixture is at least about 3:1. In this embodiment, the set gypsum composition is formed from, i.e., using, calcined gypsum comprising at least 30 wt. % of non-fibrous calcined gypsum. The mixture is maintained under conditions sufficient for the calcined gypsum to form a set gypsum matrix.

In another aspect, the present invention provides a set gypsum composition prepared by a method comprising forming a mixture using at least calined gypsum and water, wherein the weight ratio of water to calined gypsum used to prepare the mixture is at least about 4.5:1. The mixture is maintained under conditions sufficient for the calcined gypsum to form a set gypsum matrix.

In another aspect, the present invention provides a set gypsum composition prepared by a method comprising forming a mixture using calcined gypsum, water, and an enhancing material selected from the group consisting of a trimetaphosphate compound, an ammonium polyphosphate having 500–3000 repeating phosphate units, a polycarboxylic compound, a surfactant, and combinations thereof. In this embodiment of the invention, the weight ratio of water to calcined gypsum used to prepare the mixture is at least about 3:1. The mixture is maintained under conditions sufficient for the calcined gypsum to form a set gypsum matrix.

In yet another aspect, the invention provides a set gypsum composition comprising a continuous phase of interlocking set gypsum matrix. The matrix includes gypsum and evaporated water voids. Desirably, the evaporated water voids volume of the matrix is at least about 69% according to the evaporated water voids volume, "EWVV," test (described herein below). In this embodiment of the invention, the set gypsum composition is formed from, i.e., using, calcined gypsum comprising at least 30 wt. % of non-fibrous calcined gypsum.

In still another aspect, the present invention provides a set gypsum composition comprising a continuous phase of interlocking set gypsum matrix, wherein the matrix includes gypsum and evaporated water voids and wherein the evaporated water voids volume of the matrix is at least about 69% according to the EWVV test. In this embodiment of the invention, the set gypsum composition is prepared using, i.e., it is formed from, an enhancing material selected from a trimetaphosphate compound, an ammonium polyphosphate having 500–3000 repeating phosphate units, a polycarboxylic compound, a surfactant, and combinations thereof.

In another aspect, the present invention provides a set gypsum composition comprising a continuous phase of interlocking set gypsum matrix, wherein the matrix includes gypsum and evaporated water voids, and wherein the evaporated water voids volume of the matrix is at least about 80% (e.g., from about 80% to about 97%) according to the EWVV test.

By way of example, the gypsum compositions of the invention can be provided in the form of a board. The board can be provided in he form of an article, such as, for example, wallboard, a door core, a structural insulated panel system component, an acoustical tile, an insulation panel, or the like. In this respect, the article can also include multiple boards (e.g., as layers). For example, the article can include a second, more dense, gypsum board such that the density of the second gypsum board is greater than the density of the board comprising the gypsum composition according to the invention.

The invention may best be understood with reference to the accompanying drawings and in the following detailed description of the preferred embodiments.

DETAILED DESCRIPTION OF THE INVENTION

The present invention provides a low-density set gypsum composition comprising a continuous phase of an interlocking set gypsum matrix having an enhanced evaporated water voids volume. The low-density set gypsum composition is preferably prepared from a mixture (e.g., slurry) comprising an elevated ratio of water to calcined gypsum.

The calined gypsum can be fibrous or non-fibrous. Non-fibrous calcined gypsum means the ordinary calcined gypsum which can be prepared according to the usual prior art process in a calciner (e.g., kettle or rotary) at normal atmospheric pressures, such as, for example, as described in U.S. Pat. No. 2,341,426. Fibrous calcined gypsum is described, for example, in U.S. Pat. Nos. 4,029,512 and 5,041,333. Preferably, at least 30 wt. % of the gypsum composition is formed from, i.e., using, non-fibrous calcined gypsum. More preferably, at least 50 wt. % of the gypsum composition is formed from, i.e., using, non-fibrous calcined gypsum, and, in some embodiments, the calcined gypsum utilized to make the slurry (or mixture) from which the inventive set gypsum composition is cast consists essentially of non-fibrous calcined gypsum.

The calcined gypsum can be in the form of alpha calcium sulfate hemihydrate, beta calcium sulfate hemihydrate, water-soluble calcium sulfate anhydrite, or mixtures thereof. Preferably, the calcined gypsum includes at least 30% beta calcium sulfate hemihydrate, and more preferably, at least 50% beta calcium sulfate hemihydrate. In some embodiments, the calcined gypsum consists essentially of beta calcium sulfate hemihydrate.

In particular, the set gypsum composition according to the invention is characterized by a relatively loose and open structure by virtue of the enhanced evaporated water voids volume present in the continuous phase of set gypsum matrix. The enhanced water voids volume can result from, for example, use of an elevated ratio of water to calcined gypsum in the mixture used to prepare the set gypsum composition. The interlocking matrix of set gypsum is formed of crystals of any various sizes and shapes, dependent somewhat on the water to calcined gypsum ratio of the mixture used to make the set gypsum composition. For example, in some embodiments, the crystals are relatively long (e.g., about 10 $\mu$m to about 40 $\mu$m or longer in at least one direction) and/or can be of various configurations, e.g., needles, platelets, or the like, or combinations thereof.

Significantly, the inventive set gypsum composition has a desirably low density yet demonstrates sufficient strength and resistance to mechanical deformation (e.g., sag resistance) to be useful, despite the enhanced evaporated water voids volume in the set gypsum matrix. In addition, the set gypsum composition of the invention exhibits dimensional stability such that it resists shrinkage (e.g., due to drying stresses) during the preparation of the set gypsum composition, even in view of the elevated levels of water present during the preparation of the set gypsum composition. Furthermore, the enhanced evaporated water voids volume in the set gypsum composition helps to impart desirable acoustical properties in as much as the loose structure connected with the enhanced evaporated water voids volume provides enlarged space in the set gypsum composition for sound to be absorbed, such that the amount of sound reflected by, and the amount of sound transmitted through, the inventive set gypsum composition are reduced.

In accordance with the present invention, the set gypsum composition comprises a continuous phase of interlocking set gypsum matrix. The matrix includes gypsum and an enhanced evaporated water voids volume. The evaporated water voids volume is reflected in the continuous phase, which excludes discontinuities other than evaporated water voids, such as, for example, discontinuities due to the presence of paper fibers, lightweight filler, or foam air voids in the composition. In some embodiments, the evaporated water voids volume of the matrix is at least about 69% (e.g., from about 69% to about 97%) according to the EWVV test. Preferably, the evaporated water voids volume is from about 74% to about 95% according to the EWVV test. For example, in some cases, the evaporated water voids volume of the matrix is from about 79% to about 89% according to the EWVV test.

In some embodiments, the set gypsum composition according to the invention is prepared by a method comprising forming a mixture (e.g., slurry) using calcined gypsum and water in a weight ratio of water to calcined gypsum of at least about 3:1. The mixture is maintained under conditions sufficient for the calined gypsum to form a set gypsum matrix. Preferably, the weight ratio of water to calcined gypsum used to prepare the mixture is from about 3:1 to about 12:1 when the calcined gypsum includes at least 30 wt. % non-fibrous calcined gypsum. More preferably, the weight ratio of water to calcined gypsum used to prepare the mixture is from about 4.5:1 to about 9:1, and even more preferably, the weight ratio of water to calcined gypsum used to prepare the mixture is from about 5:1 to about 8:1. In these embodiments, the non-fibrous calcined gypsum is preferably beta-calcium sulfate hemihydrate.

In some embodiments, the set gypsum according to the invention is prepared by a method comprising forming a mixture (e.g., slurry) which includes water and fibrous or non-fibrous calcined gypsum, or both fibrous and non-fibrous calined gypsum in various combinations or preparations, in a water to calcined gypsum weight ratio of at least about 4.5:1 up to about 12:1. Desirably, the water to calcined gypsum weight ratio used to prepare the mixture in this embodiment is from about 5:1 to about 8:1 and more preferably from about 5:1 to about 7:1.

Desirably, the inventive set gypsum composition has a relatively low density. Strictly by way of example, in some embodiments, the gypsum composition has a density of about 20 lb/ft$^3$ ($\approx$320 kg/m$^3$) or less, such as about 15 lb/ft$^3$ ($\approx$240 kg/m$^3$) or less, or, in some embodiments, about 12 lb/ft$^3$ ($\approx$192 kg/m$^3$) or less.

Preferably, the set gypsum composition of the present invention is prepared by including one or more enhancing materials in the aqueous calcined gypsum mixture, in order to promote strength and/or dimensional stability (e.g., by minimizing shrinkage due to drying stresses) during preparation of the set gypsum composition. Desirably, the enhancing materials are selected so that they do not retard the rate of, or otherwise adversely affect, the formation of the inventive set gypsum composition. By way of example, the enhancing material can be selected from a trimetaphosphate compound, an ammonium polyphosphate having 500–3000 repeating phosphate units, a polycarboxylic compound, or a surfactant. One or more of each type of enhancing material can be used in the practice of the invention. Also, various combinations of enhancing materials can be used as well. For example, a trimetaphosphate compound and one or more of an ammonium polyphosphate, a polycarboxylic compound, and a surfactant can be used. Further by way of example, ammonium polyphosphate and one or more of a trimetaphosphate, a polycarboxylic compound, and a surfactant can be used.

During preparation of the set gypsum composition, the enhancing material can be added in any suitable amount to the aqueous calcined gypsum mixture, such as an amount of from about 0.01% to about 5% by weight of the calined gypsum. Preferably, the enhancing material is added to or included in the aqueous caldned gypsum mixture in an amount of from about 0.1% to about 5% by weight of the calcined gypsum and, more preferably, the enhancing material is added to or included in the aqueous calcined gypsum mixture in an amount of from about 0.5% to about 2% by weight of the calcined gypsum.

The use of a trimetaphosphate compound (e.g., salt or anionic portion thereof) is particularly preferred. Inclusion of the trimetaphosphate compound during the hydration of calcined gypsum to form set gypsum results in enhanced strength, including resistance to mechanical deformation (e.g., sag), of the set gypsum. In this respect, the increase in strength observed by the use of a trimetaphosphate compound is particularly desirable because of the reduced density and enhanced evaporated water voids volume in the interlocking matrix of the set gypsum. The trimetaphosphate compound can be, for example, in the form of a salt, e.g., sodium trimetaphosphate, calcium trimetaphosphate, sodium calcium trimetaphosphate, potassium trimetaphosphate, ammonium trimetaphosphate, lithium trimetaphosphate, or the like. Combinations of these salts can also be used. In some embodiments, the trimetaphosphate compound is sodium trimetaphosphate.

If included, the trimetaphosphate compound can be provided alone or in combination with at least one ammonium polyphosphate having 500–3000 repeating units, at least one polycarboxylic compound, and/or a surfactant. If included, the amount of trimetaphosphate compound added to or included in the water/calcined gypsum mixture used to make the set gypsum composition preferably is from about 0.1% to about 2% by weight of the calcined gypsum, and more preferably, the amount of trimetaphosphate compound added to or included in the aqueous calcined gypsum mixture is from about 0.5% to about 1% by weight of the calcined gypsum.

The ammonium polyphosphate (e.g., salt or anionic portion thereof preferably has about 1000–3000 repeating units. If included, the amount of the ammonium polyphosphate added to or included in the water/calcined gypsum mixture used to make the set gypsum composition preferably is from about 0.1% to about 2% by weight of the calcined gypsum, and more preferably, the amount of ammonium polyphosphate added to or included in the aqueous calcined gypsum mixture is from about 0.5% to about 1% by weight of the calined gypsum.

The polycarboxylic compound (e.g., acid, salt, or anionic portion thereof) includes at least two carboxylate salt or ion groups, at least two carboxylic acid groups, or at least one carboxylate salt or ion group and at least one carboxylic acid group. Preferably, the polycarboxylic compound is soluble in water. The polycarboxylic compounds are beneficial because it is believed that they aid in the binding of crystals as the set gypsum interlocking matrix forms. As a result, the polycarboxylic compounds desirably enhance strength, thereby aiding in reducing damage of the set gypsum composition during handling and processing, and they enhance the dimensional stability of the set gypsum composition. Preferably, the polycarboxylic compounds of the invention have a molecular weight of from about 100,000 daltons to about 1 million daltons. Polycarboxylic compounds of higher molecular weight are less desirable because the viscosity is too high while those of lower molecular weight (progressively decreasing below 100,000 daltons) are less effective.

In some embodiments, the polycarboxylic compound has a molecular weight of from about 200,000 daltons to about 700,000 daltons, preferably a molecular weight of from about 400,000 daltons to about 600,000 daltons (e.g., about 500,000 daltons). By way of example, and not limitation, the polycarboxylic compound can be selected from polyacrylates, polymethacrylates, polyethacrylates, and the like, or combinations thereof. In some embodiments, the polycarboxylic compound is a polyacrylate, in which case the polyacrylate preferably has a molecular weight of from about 200,000 daltons to about 700,000 daltons, more preferably about 400,000 daltons to about 600,000 daltons. By way of example, one suitable polyacrylate is ACRYSOL® 644, commercially available from Rohm & Haas, Philadelphia, Pa.

If included, the amount of polycarboxylic compound added to or included in the water-calcined gypsum mixture used to make the set gypsum composition preferably is from about 0.05% to about 2% by weight of the calcined gypsum used to make the mixture, and more preferably, the amount of the polycarboxylic compound added to or included in the aqueous calcined gypsum mixture is from about 0.1% to about 0.4% by weight of the calcined gypsum.

It is noteworthy that the polycarboxylic compound can be included alone, or in combination with other enhancing materials. For example, the polycarboxylic compound can be included with a trimetaphosphate compound, an ammonium polyphosphate having 500–3000 repeating phosphate units (e.g., 1000–3000 repeating phosphate units), and/or a surfactant.

Inclusion of one or more surfactants in the water/calcined gypsum mixture during preparation of the gypsum composition according to the invention provides the benefit of decreasing the surface tension of the mixture, and, in turn, assists in reducing drying stresses such that shrinkage of the set gypsum composition is minimized. In this respect, it is believed that by reducing the surface tension of the aqueous mixture of calcined gypsum, the capillary pressure that the liquid applies on gypsum crystals is reduced, as is the corresponding resisting force of the gypsum crystals against the aqueous liquid, thereby reducing the tendency of the interlocking crystalline matrix structure to shrink when unreacted aqueous liquid evaporates from the matrix. Accordingly, surfactants that are particularly useful in the practice of the invention preferably are characterized by having the capability of reducing the surface tension of water to about 40 dyne/cm or below. More preferably, the surfactant is characterized by having the capability of reducing the surface tension of water to about 35 dyne/cm or below. Examples of suitable surfactants include, but are not limited to, acetylenic glycol based surfactants, fluoro-containing surfactants, and silicone-containing surfactants. One or more surfactants can be included in the mixture used to form the set gypsum composition, and various combinations of the different types of surfactants can also be used.

An exemplary acetylenic glycol-based surfactant is DYNOL® 604, commercially available from Air Products of Lehigh Valley, Pa. Exemplary fluoro-containing surfactants can be in the form of anionic fluorosurfactants of the alkyl sodium sulfonate type (e.g., LODYNE® S-103 A), cationic fluorosurfactants of the alkylammonium chloride type (e.g., LODYNE® S-106 A), or amphoteric fluorosurfactants of the alkyl amino acid type (e.g., LODYNE® S-100). Also exemplary of a suitable surfactant pursuant to the invention is a blend of fluoro-containing/silicone-containing surfactants commercially available as LODYNE® S-228M. Surfactants of the LODYNE® series are commercially available from Ciba, of Basel, Switzerland.

The surfactant can be provided in any suitably effective amount. Preferably, the amount of the surfactant added to or included in the water/calcined gypsum mixture is from about 0.01% to about 1%, and more preferably, the amount of the surfactant added to or included in the aqueous calcined gypsum mixture is from about 0.05% to about 0.2% by weight of the calcined gypsum. Notably, the surfactant can be provided as the only enhancing material in the gypsum composition or it can be provided in combination with other enhancing materials, such as, for example, a trimetaphosphate compound, an ammonium polyphosphate having 500–3000 repeating phosphate units (e.g., 1000–3000 repeating units), a polycarboxylic compound, or mixtures thereof.

The gypsum composition can also include optional additives, such as, but not limited to, a reinforcing additive, a binder (e.g., polymers such as latex), expanded perlite, air voids formed by an aqueous foam, a starch such as a pregelatinized starch, or a fibrous mat (e.g., on a gypsum board comprising the inventive gypsum composition). Various combinations of these optional additives can be included in the set gypsum composition. These additives can be included in gypsum compositions that also include one or more of the enhancing materials, as desired.

The optional reinforcing additive can be included in the inventive gypsum composition, if desired, in order to enhance strength and filtration efficiency during processing as discussed in more detail herein below. For example, the reinforcing additive can include cellulosic (e.g., paper) fibers, mineral fibers, other synthetic fibers, or the like, or combinations thereof. The reinforcing additive, such as paper fibers, can be provided in any suitable amount. For example, in some embodiments, the reinforcing additive is present in an amount of from about 2% to about 15% by weight of the set gypsum composition.

To further facilitate a decrease in density, the set gypsum composition of the invention optionally can include air voids formed by an aqueous foam (as opposed to the evaporated water voids). In particular, an aqueous foam can be added to the aqueous calcined gypsum mixture during preparation such as in current board production. Any suitable foaming agents can be used in the practice of the invention, such as, for example, PFM 33, available from GEO specialty chemicals, Ambler, Pa.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. ($\approx$85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch can be present in any suitable amount. For example, if included, the pregelatinized starch can be added to the mixture used to form the set gypsum composition such that it is present in an amount of from about 0.5% to about 10% percent by weight of the set gypsum composition.

The gypsum composition can also include a fibrous mat. The fibrous mat can be woven or nonwoven. Desirably, the fibrous mat is composed of a material that can accommodate the expansion of the gypsum composition during hydration. By way of example, the fibrous mat can be in the form of a paper mat, a fiberglass mat, or other synthetic fiber mat. In some embodiments, the fibrous mat is nonwoven and can include fiberglass. Desirably, the fibrous mat can be applied to the surface of the gypsum cast during formation in order to form a flat surface and to improve the integrity, appearance, and handling ability of the dried gypsum cast during production, handling, and field application. In addition, the fibrous mat can be utilized as the exposed surface in a final product (e.g., a ceiling tile), and, as such, provides an aesthetically pleasing monolithic appearance that can be desirably smooth. If provided, the fibrous mat can have any suitable thickness. For example, in some embodiments, the fibrous mat has a thickness of from about 0.003 inches (a 0.0076 cm) to about 0.15 inches ($\approx$0.381 cm).

In some embodiments, acoustical properties (e.g., noise reduction) are desirable, such as, for example, when the inventive gypsum composition is present in certain articles such as acoustical tile. The gypsum composition of the present invention preferably exhibits a Noise Reduction Coefficient of at least about 0.4, according to ASTM E 1042-92, and more preferably, a Noise Reduction Coefficient at or near 1.0. For example, in some embodiments, the inventive gypsum composition demonstrates a Noise Reduction Coefficient of at least about 0.5, even more preferably a Noise Reduction Coefficient of at least about 0.6, still more preferably, a Noise Reduction Coefficient of at least about 0.7, even more preferably, a Noise Reduction Coefficient of at least about 0.8, and still more preferably, a Noise Reduction Coefficient of at least about 0.9. Generally, in accordance with the present invention, the acoustical value (e.g., as measured by its Noise Reduction Coefficient), increases as the evaporated water voids volume in the set gypsum interlocking matrix, as well as the water to calcined gypsum ratio in the mixture used to prepare the set gypsum composition, increases.

In accordance with another aspect of the invention, an article is provided, which comprises the inventive gypsum composition. For example, the article can be in the form of wallboard, a door core, a structural insulated panel system component, an acoustical tile, an insulation panel, or the like.

In addition to the inventive set gypsum composition, the article can include a second set gypsum composition, which is more dense than the inventive gypsum composition. By way of example, the inventive gypsum composition and the second, more dense, gypsum composition can be included in separate gypsum boards which are layered so as to form a composite of gypsum boards in the article. Preferably, the second gypsum board has a density of at least about 20 lb/ft$^3$ ($\approx$320 kg/m$^3$), more preferably a density of at least about 30 lb/ft$^3$, ($\approx$479 kg/m$^3$), and still more preferably, a density of at least about 40 lb/ft$^3$ ($\approx$639 kg/m$^3$). The density of the second set gypsum composition can be higher still (e.g., at least about 50 lb/ft$^3$ ($\approx$799 kg/m$^3$), at least about 60 lb/ft$^3$ ($\approx$959 kg/m$^3$), or higher). By way of contrast, the set gypsum composition of the present invention preferably has a density of less than about 20 lb/ft$^3$ ($\approx$320 kg/m$^3$), such as a density of less than about 15 lb/ft$^3$ ($\approx$240 kg/m$^3$), or less than about 12 lb/ft$^3$ ($\approx$192 kg/m$^3$).

The presence of the dense gypsum board is desirable because, for example, it provides an envelope for forming the lower density set gypsum composition of the invention. In addition, the dense gypsum board provides wet strength, e.g., during processing, and dry strength in the finished composite. The inclusion of a dense gypsum board also desirably enhances fire and sag resistance while also reflecting sound (while the lower density gypsum board of the invention absorbs sound) so as to assist in minimizing passage of sound through an article containing the composite of gypsum boards.

Figure 1:
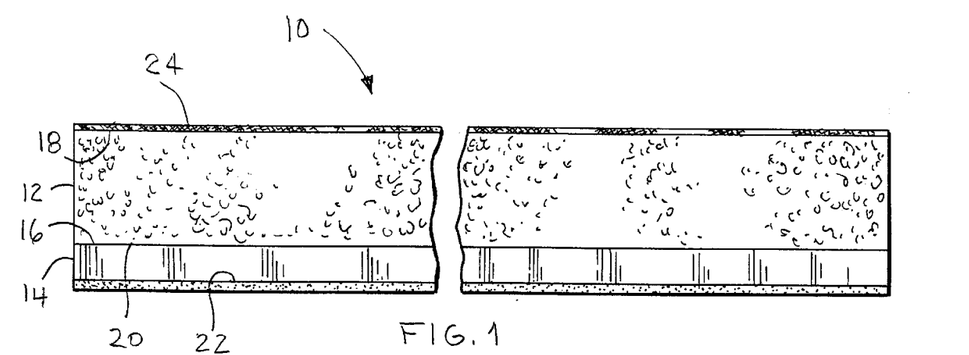
FIG. 1 is a schematic representation of a composite of gypsum board layers, in accordance with one aspect of the invention.

Referring to FIG. 1, a composite 10 is schematically illustrated. The composite 10 includes a first gypsum board 12, which includes the inventive set gypsum composition, as well as a second gypsum board 14, which includes the second set gypsum composition such that it is more dense than the first gypsum board 12. Optionally, a reinforcing mat (e.g., a porous mat) can be sandwiched between the boards 12 and 14, e.g., so as to facilitate production of the low-density board 12 and to enhance overall strength of the composite 10. In the composite 10, the boards 12 and 14 can be of any suitable thickness. For example, the first board 12 can have a thickness of from about 0.5 inches (≈1.27 cm) to about 2 inches (≈5.08 cm) while the second board 14 can have a thickness of from about 0.0625 inches (≈0.159 cm) to about 0.25 inches (≈0.635 cm).

The first gypsum board 12 includes a first surface 16 and a second surface 18, and the second gypsum board 14 includes a first surface 20 and a second surface 22. The surface 16 of gypsum board 12 is in contact with the surface 20 of the gypsum board 14. A fibrous mat 24 is applied to the surface 18 of gypsum board 12. The composite 10 also includes wallboard paper 26 carried on the surface 22 of the gypsum board 14.

Figures 2, 3:
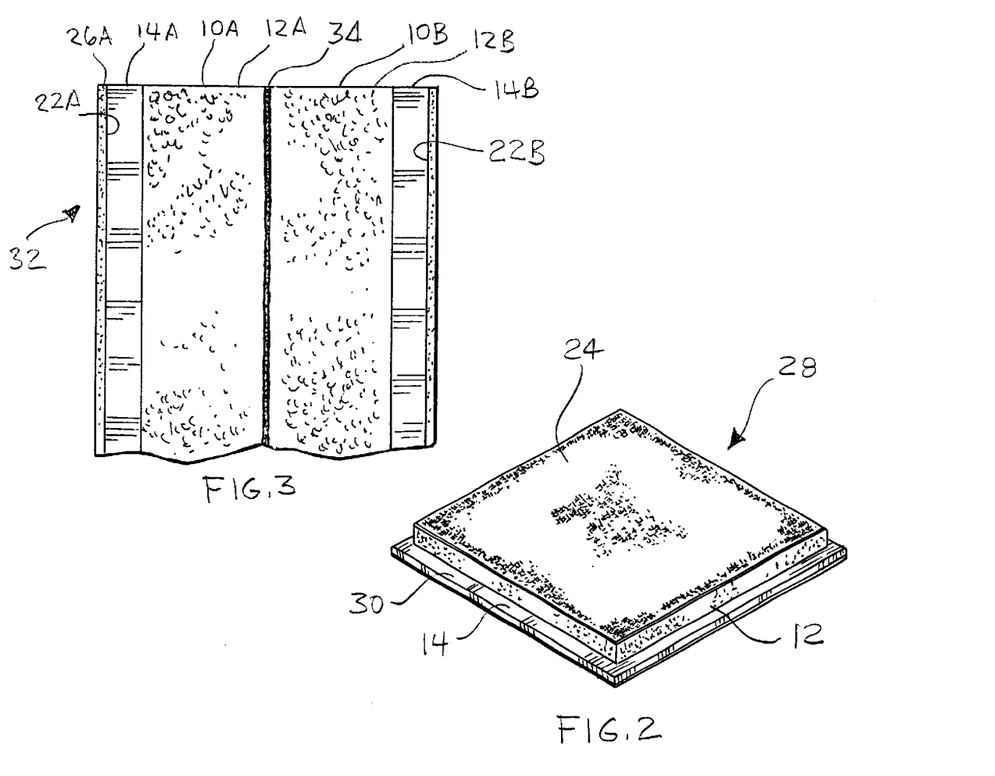
FIG. 2 is a perspective view of an article in the form of a ceiling tile, in accordance with another aspect of the invention.
FIG. 3 is a schematic representation of a laminated composite, in accordance with yet another aspect of the invention.

FIG. 2 illustrates the composite 10 shown in an exemplary article, namely, a ceiling tile 28. As in FIG. 1, the dense board, the low-density set gypsum board of the present invention, and the fibrous mat are indicated by numerals 14, 12, and 24, respectively. The ceiling tile 28 includes a ledge 30 to facilitate suspended fitting in use.

FIG. 3 illustrates two composites 10A and 10B joined to form a laminated composite 32 (e.g., containing more than one composite). The laminated composite 32 includes first gypsum boards 12A and 12B, and second, more dense, gypsum boards 14A and 14B. Wallboard paper 26A and 26B is carried on the outer surfaces 22A and 22B of gypsum boards 14A and 14B, respectively. The two composites 10A and 10B can be combined in any suitable manner. For example, the composites 10A and 10B can be combined by an adhesive 34. Although the adhesive 34 is shown in FIG. 3, one of ordinary skill in the art will appreciate that the composites 10A and 10B can be joined via any other suitable material, such as, but not limited to, gypsum, bonding agents, glues, latex, binders, or the like. It will be appreciated that, in some embodiments (e.g., where multi-step processing is utilized), a single first gypsum board 12 can be sandwiched between two dense second gypsum boards 14A and 14B, if desired.

Turning now to the preparation of the set gypsum composition in accordance with the present invention, a mixture (e.g., slurry or suspension) of calcined gypsum and water is formed. The evaporated water voids volume of the set gypsum composition of the present invention varies proportionally with the water to calcined gypsum weight ratio used to prepare the aqueous calcined gypsum mixture from which the set gypsum composition is cast. Thus, the higher the water to calined gypsum ratio used to prepare the mixture, the greater the evaporated water voids volume in the set gypsum interlocking matrix, and the lower the density of the set gypsum composition.

Preferably, the weight ratio of water to calcined gypsum having at least 30 wt. % non-fibrous calcined gypsum used to prepare the mixture is at least about 3:1, more preferably, of from about 3:1 to about 12:1. In some embodiments, the weight ratio of water to calcined gypsum having at least 30 wt. % non-fibrous calcined gypsum used to prepare the mixture is from about 4.5:1 to about 9:1, or the weight ratio of water to calcined gypsum having at least 30 wt. % non-fibrous calcined gypsum used to prepare the mixture is from about 5:1 to about 8:1. It will be appreciated that various proportions of a mixture of fibrous and non-fibrous calcined gypsum can be used in the practice of the invention. When the set gypsum composition is formed from greater than 70 wt. % of fibrous calcined gypsum, the water to calcined gypsum weight ratio used to prepare the mixture is at least about 4.5:1 to about 12:1, preferably, the weight ratio of water to calcined gypsum in this embodiment is from about 4.5:1 to about 9:1, and more preferably from about 5:1 to about 8:1.

Prior to casting the mixture, one or more enhancing materials, such as, for example, a trimetaphosphate compound, an ammonium polyphosphate having 500–3000 repeating phosphate units, a polycarboxylic compound, a surfactant, or combinations thereof, is introduced into the aqueous mixture of calcined gypsum. The amount of enhancing material introduced into the aqueous calcined gypsum mixture is preferably based on the amount by weight of the calcined gypsum added to form the mixture.

Also prior to casting, the aqueous calined gypsum mixture can be provided with optional additives, such as, but not limited to, a reinforcing additive (such as fibers), a binder (e.g., polymers such as latex), expanded perlite, an aqueous foam for forming foam induced voids in the set matrix composition, a starch (such as a pregelatinized starch), accelerating agents, retarding agents, biocides, fungicides, bactericides, water resistance agents, other additives as will be appreciated by one of ordinary skill in the art, and combinations thereof.

The aqueous calcined gypsum mixture, which now includes the enhancing material and other optional additives, desirably is stirred while wet and then cast (e.g., in the form of a board). During formation of the cast, a fibrous mat, as described herein, optionally can be applied to a surface of the mixture. In order to reduce drying costs, the wet gypsum cast can be filtered (e.g., at about 20 to about 50 mmHg), if desired, to drain excess water after full hydration of the calined gypsum. The filtered or unfiltered gypsum cast is then dried (e.g., in an oven or kiln) to form the dried set gypsum composition.

Significantly, the gypsum composition in accordance with the invention exhibits dimensional stability and, particularly, is resistant to shrinkage during the process. In this respect, the set gypsum composition experiences shrinkage of about 2% or less during preparation thereof, more preferably, a shrinkage of about 1% or less, and even more preferably, a shrinkage of about 0.1% or less. It is particularly surprising that such a low density set gypsum composition can be made with such a low degree of shrinkage.

As will be appreciated by one of ordinary skill in the art, further treatment can be applied after drying. For example, the set gypsum composition can be treated with a surface coating, resin, and/or silicate impregnate to reinforce the gypsum composition and to improve physical, chemical and mechanical properties.

Strictly by way of example, an exemplary process scheme for the preparation of a low-density set gypsum board is set forth below:

Scheme 1

Stucco, accelerator, and other dry additives
↓
Desired water, paperfiber pulp + Acrysol 644
↓
Foam (surfactant solutions)
↓
Mixing/Stirring (wet)
↓
Gypsum cast/Final setting
↓
Drying (strength developing).

To form a composite (e.g., for use in an article), wallboard paper is provided with a double crease near each edge. The creased edges are folded up desirably to form a tray. A dense layer of gypsum slurry is laid on the paper from a gypsum board mixer, with thickness and placement of the layer monitored as will be appreciated by one of ordinary skill in the art. Remaining aqueous calcined gypsum mixture is routed through an additional mixing process in order to add more water (and, as desired, enhancing materials and/or optional additives as described herein) in order to prepare the mixture for formation of the lower density set gypsum composition of the invention. The slurry for the low-density layer is then laid over the dense layer with rollers, cleaning devices and the like, as will be appreciated by those of ordinary skill in the art. A woven or non-woven fibrous mat can be applied if desired.

Such composite formation can be carried out on a conventional gypsum board manufacturing line, to undergo a setting process. When the composite is nearly hydrated, a top portion of the low-density board optionally can be perforated to improve drying properties and enhance its noise reduction properties. The composite is then cut to desired length, e.g., using board knives or high pressure cutting jets. The board can then be dried, e.g., with paper side down and the paperless or fiber mat side up.

Additional finishing varies depending upon the desired article. For example, with respect to ceiling tiles, the finishing involves sawing to desired size, texturing, coating, and packaging. Finishing processes for other applications can involve, for example, face lamination (paper side out), back lamination (paper side in), dimensional finishing (end saws), and coating processes where desired.

The evaporated water voids volume of the set gypsum compositions in accordance with the invention was determined by the evaporated water voids volume (EWVV) test described below. The test uses scanning electron microscopy and imaging microscopy analysis to determine the water voids volume of the set gypsum interlocking matrix. The test distinguishes voids that may be in the set gypsum composition due to foaming agents or the like.

In preparation for the EWVV test, a set gypsum composition is first made. A sample of the set gypsum composition is then prepared for SEM analysis as follows: Epoxy (Buhler epoxy was used) and epoxide hardener are first placed under high vacuum for degassing in separate cups. After degassing, epoxy and hardener are mixed in a 6:1 proportion under ambient pressure for 5 minutes in a rotating cup with minimal addition of air. The cup containing this mixture and the sample, placed in a rubber mounting cup, are then placed under high vacuum. The epoxy mixture is then poured over the gypsum sample using a remotely activated electric motor that tilts the epoxy cup into position. Air is slowly admitted in the chamber and the added pressure drives the epoxy into all empty spaces that form the set gypsum. A sample label is inserted in the epoxy before curing so as to avoid any confusion in sample identification.

After curing, grinding is carried out by lapping with 120 micron, followed by 75 micron, 45 micron and 15 micron metal bonded diamond wheels. Enough sample is ground so as to provide a view of gypsum sample cross-section.

Polishing follows grinding, using 9 micron (30 minutes) and 1 micron (30 minutes) METADI (commercially available from Buhler, Lake Bluff, Ill.), oil based diamond slurry on TEXMET (also available from Buhler) at 120 RPM.

The sample is then coated with a thin layer of carbon, using a Denton Vacuum Desk II sputter system equipped with a carbon attachment. Care is taken to provide a uniform carbon coat over the polished cross sections to avoid oscillations in brightness and contrast during image acquisition.

Each sample is then painted with silver to provide ground contact during SEM imaging at 300× magnification. All samples are imaged in a Topcon SM300 SEM equipped with a solid state back-scattered electron detector. Images are selected visually such that the area being analyzed is only the continuous phase of set gypsum matrix including its evaporated water voids and excluding macro-sized discontinuities, e.g., foam air voids, paper fibers and the like, that are not part of the continuous phase of interlocking set gypsum matrix. The SEM analysis is conducted as described by King et al., "An Effective SEM-Based Image Analysis System for Quantitative Mineralogy," *Kona Powder and Particle*, No. 11 (1993) which is incorporated by reference herein, using computer software described therein. The imaging analysis provides the evaporated water voids volume for the interlocking matrix of the set gypsum composition.

The following examples further illustrate the present invention but, of course, should not be construed as in any way limiting its scope.

EXAMPLE 1

Procedure for the Preparation of Laboratory Gypsum Cast and Various Tests

Samples of set gypsum-containing compositions were prepared in accordance with the invention and compared with regard to their dry density, noise reduction value (NRC), and drying shrinkage.

Gypsum casts were prepared by dry blending: 300 g of beta calcium sulfate hemihydrate; 2.0 g of a set accelerator comprising fine ground particles of calcium sulfate dihydrate coated with sugar to maintain efficiency and heated as described in U.S. Pat. No. 3,573,947, the disclosure of which is hereby incorporated herein by reference; at various water to stucco (i.e. calcined gypsum) ratios. The samples then were mixed with various amounts of tap water having a temperature of 70° F. (≈21° C.) in a 5-liter WARING blender, allowed to soak for 5 seconds and mixed at low speed for 10 to 25 seconds. The amount of water and stucco (i.e., calcined gypsum) was varied to provide water to stucco ratios of from about 1:1 to about 9:1. The slurries thus formed were cast into desired molds to prepare gypsum casts (six-inch diameter and half inch thickness ring). After the calcium sulfate hemihydrate set to form gypsum cast (calcium sulfate dihydrate), the ring was removed from the molds and dried in a ventilated oven at 112° F. (≈44.4° C.) for at least 24 hours or until their weight stopped changing. The dried gypsum casts were then used for the EWVV test, the measurement of density, NRC, and drying shrinkage.

analyzed at 300× magnification, and these ten images were subjected to the imaging analysis described above to the EWVV test. Measured values are reported as an average of the ten images analyzed and are estimated to have an experimental error of about +/−5% based on the EWVV test itself.

In the tables:

TMP denotes sodium trimetaphosphate;

APP denotes ammonium polyphosphate;

PC denotes a poly(acrylic acid) having a molecular weight of about 500,000; and

S denotes a surfactant capable of lowering the surface tension of the water, calcined gypsum mixture from which the set gypsum is cast to about 40 dynes/cm.

TABLE I

| Example No. | Calcined Gypsum, gms | Water, gms | Water/ Calcined Gypsum Ratio | Additive, dry Wt. % Based on Calcined Gypsum | | | | EWVV |
|---|---|---|---|---|---|---|---|---|
| | | | | TMP | APP | PC | S | |
| 1 | 300 | 300 | 1 | — | — | — | — | 0.509 |
| 2 | 300 | 600 | 2 | — | — | — | — | 0.611 |
| 3 | 300 | 900 | 3 | 0.2 | — | — | — | 0.741 |
| 4 | 300 | 1200 | 4 | 0.5 | 0.5 | — | — | 0.774 |
| 5 | 300 | 1500 | 5 | 1 | 1 | — | — | 0.841 |
| 6 | 300 | 1800 | 6 | 1 | — | 0.1 | — | 0.845 |
| 7 | 300 | 2100 | 7 | 1 | — | 0.2 | 0.01 | 0.848 |
| 8 | 300 | 2400 | 8 | 1 | — | 0.25 | 0.01 | 0.874 |
| 9 | 300 | 2700 | 9 | 1 | — | 0.3 | 0.01 | 0.882 |

Density of gypsum cast was obtained from its volume and weight measurements. Shrinkage of gypsum cast was calculated from the difference in their size before and after drying. NRC value of gypsum cast was obtained from the standard impedance tube test (per ASTM procedure ASTM E 1042-92). The evaporated water voids volume of the gypsum cast was obtained from the evaporated water voids volume test described above.

EWVV results are reported in TABLE I below, as average values of three tested samples. The results reflect approximately 87% pure gypsum samples (with approximately 13% impurities). The EWVV varies directly with the purity of the calcined gypsum used to prepare the set gypsum interlocking matrix. Thus, EWVV values are expected to be higher with higher purity calcined gypsum. EWVV values are expected to be lower with calcined gypsum having a larger percentage of impurities. Ten images for each sample were The data in Table I illustrates the variation in the water voids volume of the set gypsum interlocking matrix as the water to calcined gypsum ratio changes. More specifically, it is seen that the EWVV for the set gypsum composition increases as the water to stucco ratio of the mixture from which the set gypsum composition is cast increases. The data also show that unexpectedly high water to stucco ratios can be used to prepare a set gypsum interlocking matrix with a very high degree of evaporated water voids. Such compositions are beneficial due to their low density and/or their acoustical properties, as can be seen in the data in Table II.

Table II illustrates the preparation of set gypsum compositions made with various water to stucco ratios, and with various enhancing materials in accordance with the invention. For comparison purposes, set gypsum compositions which do not include the enhancing materials are also included.

TABLE II

| Test No. | Calcined gypsum, gms | Water, gms | Water/ Calcined Gypsum Ratio | Additive, Dry Wt. % Based On Calcined Gypsum | | | | % Shrinkage | NRC Value | Density, pcf |
|---|---|---|---|---|---|---|---|---|---|---|
| | | | | TMP | APP | PC | S | | | |
| 1 | 300 | 300 | 1 | — | — | — | — | 0 | 0.21 | 54.3 |
| 2 | 300 | 600 | 2 | — | — | — | — | 0 | 0.21 | 30.6 |

TABLE II-continued

| Test No. | Calcined gypsum, gms | Water, gms | Water/Calcined Gypsum Ratio | Additive, Dry Wt. % Based On Calcined Gypsum | | | | % Shrinkage | NRC Value | Density, pcf |
|---|---|---|---|---|---|---|---|---|---|---|
| | | | | TMP | APP | PC | S | | | |
| 3 | 300 | 900 | 3 | — | — | — | — | 0.5 | 0.23 | — |
| 4 | 300 | 900 | 3 | 0.1 | — | — | — | 0 | — | 21.4 |
| 5 | 300 | 900 | 3 | — | — | 0.05 | — | 0 | — | — |
| 6 | 300 | 900 | 3 | — | — | — | 0.01 | 0 | — | — |
| 7 | 300 | 1200 | 4 | — | — | — | — | 2.1 | — | — |
| 8 | 300 | 1200 | 4 | 0.5 | — | — | — | 0 | 0.25 | 17.3 |
| 9 | 300 | 1200 | 4 | — | 0.5 | — | — | 0 | — | — |
| 10 | 300 | 1200 | 4 | — | — | 0.2 | — | 0 | — | — |
| 11 | 300 | 1200 | 4 | — | — | — | 0.02 | 0 | — | — |
| 12 | 300 | 1500 | 5 | — | — | — | — | 5.8 | — | — |
| 13 | 300 | 1500 | 5 | 0.5 | 0.5 | — | — | 0 | 0.3 | 13.5 |
| 14 | 300 | 1500 | 5 | — | — | 0.2 | — | 0 | — | — |
| 15 | 300 | 1500 | 5 | — | — | — | 0.05 | 0 | — | — |
| 16 | 300 | 1800 | 6 | — | — | — | — | 31.1 | — | — |
| 17 | 300 | 1800 | 6 | 1.0 | 1.0 | — | — | 0 | 0.34 | 11.5 |
| 18 | 300 | 1800 | 6 | — | — | 0.3 | — | 0 | — | — |
| 19 | 300 | 1800 | 6 | — | — | 0.2 | 0.05 | 0 | — | — |
| 20 | 300 | 2100 | 7 | — | — | — | — | 51.3 | — | — |
| 21 | 300 | 2100 | 7 | 1.0 | 1.0 | — | — | 2.5 | — | — |
| 22 | 300 | 2100 | 7 | 0.5 | — | 0.2 | 0.02 | 0 | 0.39 | 11.3 |
| 23 | 300 | 2400 | 8 | — | — | — | — | 56.7 | — | — |
| 24 | 300 | 2400 | 8 | 0.5 | — | 0.3 | 0.05 | 0 | 0.48 | 11.1 |
| 25 | 300 | 2400 | 8 | 0.5 | 0.5 | 0.2 | 0.01 | 0 | — | — |
| 26 | 300 | 2700 | 9 | 0.5 | — | 0.3 | 0.05 | — | 0.56 | — |
| 27 | 300 | 3000 | 10 | — | — | — | — | 66.7 | — | — |
| 28 | 300 | 3000 | 10 | 0.1 | — | 0.3 | 0.05 | 0 | 0.63 | — |

The data in Table II further illustrate that low density set gypsum compositions can be prepared in accordance with the invention. The data also show that as the water to stucco ratio used in the aqueous calcined gypsum mixture from which the set gypsum composition is cast increases, the density of the set gypsum composition decreases. The reduction in density is due to the greater volume of evaporated water voids in the set gypsum compositions made using the higher water to stucco ratios.

The data also illustrate the improved acoustical properties as measured by the NRC value that can be achieved with set gypsum compositions made using the higher water to stucco ratios in accordance with the invention. It will be appreciated that the NRC values reported in Table 11 are for the set gypsum interlocking matrix itself, as there are no other sound absorbing additives, such as paper fibers or the like, in these compositions which contribute to the acoustical properties. The higher NRC values of the set gypsum interlocking matrix allow for the preparation of low density gypsum-based acoustical tile with high NRC values, and which can be further enhanced in terms of their acoustical behavior with the selection of additives and other techniques known in the art for improving acoustical performance. Alternatively, by using the high NRC compositions in accordance with the invention, it is possible to use less paper or other known acoustical enhancers and still achieve acoustical tile meeting or exceeding industry standards.

Further, the low density set gypsum compositions which are made using enhancing materials in accordance with the invention are less prone to shrinkage than low density set gypsum compositions made without the enhancing materials. Accordingly, set gypsum compositions of any size or shape, including, for example, board, acoustical tile, panels, door cores, or the like, can be made to standard sizes and tolerances without significant shrinkage and its attendant loss, e.g., scrap.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A set gypsum composition prepared by a method comprising:

preparing a mixture formed from at least calcined gypsum and water, wherein at least 30 wt. % of said calcined gypsum is non-fibrous and wherein the weigh ratio of water to calcined gypsum used to form the mixture is at least about 3:1; and maintaining the mixture under conditions sufficient for the calcined gypsum to form an interlocking matrix of set gypsum.

2. The gypsum composition of claim 1, wherein said composition is included in a gypsum board.

3. The gypsum composition of claim 1, wherein the mixture further is formed from an enhancing material selected from the group consisting of a trimetaphosphate compound, an ammonium polyphosphate having 500–3000 repeating phosphate units, a polycarboxylic compound, a surfactant, and combinations thereof.

4. The gypsum composition of claim 3, wherein the ammonium polyphosphate has 1000–3000 repeating units.

5. The gypsum composition of claim 3, wherein the enhancing material is sodium trimetaphosphate, or sodium trimetaphosphate and at least one ammonium polyphosphate having 1000–3000 repeating units.

6. The gypsum composition of claim 3, wherein the enhancing material is sodium trimetaphosphate and at least one ammonium polyphosphate having 1000–3000 repeating phosphate units.

7. The gypsum composition of claim 3, wherein the amount of enhancing material used to form the mixture is from about 0.01% to about 5% by weight of said calcined gypsum.

8. The gypsum composition of claim 3, wherein the amount of at least one of the trimetaphosphate compound or ammonium polyphosphate having 500–3000 repeating phosphate units used to form the mixture is from about 0.1% to about 2% by weight of said calcined gypsum.

9. The gypsum composition of claim 3, wherein the polycarboxylic compound has a molecular weight of from about 200,000 daltons to about 700,000 daltons.

10. The gypsum composition of claim 3, wherein the polycarboxylic compound is selected from the group consisting of polyacrylates, polymethacrylates, polyethacrylates, and combinations thereof.

11. The gypsum composition of claim 3, wherein the polycarboxylic compound is a polyacrylate.

12. The gypsum composition of claim 3, wherein the amount of polycarboxylic compound used to form the mixture is from about 0.05% to about 2% by weight of the calcined gypsum.

13. The gypsum composition of claim 3, wherein the enhancing material is a trimetaphosphate compound and a polycarboxylic compound, or an ammonium polyphosphate having 500–3000 repeating phosphate units and a polycarboxylic compound.

14. The gypsum composition of claim 3, wherein the surfactant is selected from the group consisting of acetylenic glycol based surfactants, fluoro-containing surfactants, silicone-containing surfactants, and combinations thereof.

15. The gypsum composition of claim 3, wherein the surfactant is characterized by having the capability of reducing the surface tension of water to about 40 dyne/cm or below.

16. The gypsum composition of claim 3, wherein the surfactant is characterized by having the capability of reducing the surface tension of water to about 35 dyne/cm or below.

17. The gypsum composition of claim 3, wherein the amount of surfactant used to prepare the mixture is from about 0.01% to about 1% by weight of said calcined gypsum.

18. The gypsum composition of claim 1, wherein said composition further comprises at least one reinforcing additive.

19. The gypsum composition of claim 18, wherein the reinforcing additive includes paper fibers.

20. The gypsum composition of claim 19, wherein the paper fibers are present in an amount of from about 2% to about 15% percent by weight of said gypsum composition.

21. The gypsum composition of claim 1, wherein said composition further comprises air voids formed by an aqueous foam.

22. The gypsum composition of claim 1, wherein said composition further comprises a starch.

23. The gypsum composition of claim 22, wherein the amount of starch used to prepare the mixture is from about 0.5% to about 15% by weight of the calcined gypsum.

24. The gypsum composition of claim 1, wherein said composition has a Noise Reduction Coefficient of at least about 0.4, according to ASTM E 1042-92.

25. The gypsum composition of claim 1, wherein said composition has a Noise Reduction Coefficient of at least about 0.5, according to ASTM E 1042-92.

26. The gypsum composition of claim 1 wherein said composition further comprises at least two of the following: a binder, expanded perlite, a starch, a reinforcing additive, and air voids formed by an aqueous foam.

27. The gypsum composition of claim 1, wherein the weight ratio of water to calcined gypsum used to prepare the mixture is from about 3:1 to about 12:1.

28. The gypsum composition of claim 1, wherein the weight the ratio of water to calcined gypsum used to prepare the mixture is from about 4.5:1 to about 9:1.

29. The gypsum composition of claim 28, wherein the mixture is further formed from an enhancing material selected from the group consisting of a trimetaphosphate compound, an ammonium polyphosphate having 500–3000 repeating phosphate units, a polycarboxylic compound, a surfactant, and combinations thereof.

30. The gypsum composition of claim 1, wherein the weight ratio of water to calcined gypsum used to prepare the mixture from about 5:1 to about 8:1.

31. The gypsum composition of claim 1, wherein at least 50% by weight of said calcined gypsum is beta calcium sulfate hemihydrate.

32. The gypsum composition of claim 1, wherein the set gypsum composition shrinks by at most about 2%.

33. A set gypsum composition prepared by a method comprising:
preparing a mixture formed from at least calcined gypsum and water, wherein the weight ratio of water to calcined gypsum used to prepare the mixture is at least about 4.5:1; and
maintaining the mixture under conditions sufficient for the calcined gypsum to form an interlocking matrix of set gypsum.

34. The gypsum composition of claim 33, wherein the weight ratio of water to calcined gypsum used to prepare the mixture is from about 4.5:1 to about 12:1.

35. The gypsum composition of claim 33, wherein the weight ratio of water to calcined gypsum used to prepare the mixture is from about 4.5:1 to about 9:1.

36. The gypsum composition of claim 33, wherein the mixture further is formed from an enhancing material selected from the group consisting of a trimetaphosphate compound, an ammonium polyphosphate having 500–3000 repeating phosphate units, a polycarboxylic compound, a surfactant, and combinations thereof.

37. The gypsum composition of claim 36, wherein the mixture is further formed from at least one member selected from the group consisting of a starch, a binder, expanded perlite, a reinforcing additive, an aqueous foam, and mixtures thereof.

38. The gypsum composition of claim 33, wherein the weight ratio of water to calcined gypsum used to form the mixture is from about 5:1 to about 8:1.

39. The gypsum composition of claim 33, wherein the gypsum composition shrinks by at most about 2%.

40. The gypsum composition of claim 33, wherein at least 50% by weight of said calcined gypsum is beta calcium sulfate hemihydrate.

41. A set gypsum composition prepared by a method comprising:
preparing a mixture formed from at least calcined gypsum, water, and an enhancing material selected from the group consisting of a trimetaphosphate compound, an ammonium polyphosphate having 500–3000 repeating phosphate units, a polycarboxylic compound, a surfactant, and combinations thereof wherein the weight ratio of water to calcined gypsum present in the mixture is at least about 3:1; and
maintaining the mixture under conditions sufficient for the calcined gypsum to form an interlocking matrix of set gypsum.

42. The gypsum composition of claim 41, wherein the enhancing material is sodium trimetaphosphate or sodium trimetaphosphate and at least one ammonium polyphosphate having 1000–3000 repeating units.

43. The gypsum composition of claim 41, wherein the polycarboxylic compound is a polyacrylate having a molecular weight of from about 200,000 daltons to about 700,000 daltons.

44. The gypsum composition of claim 41, wherein the ammonium polyphosphate has 1000–3000 repeating units.

45. The gypsum composition of claim 41, wherein the surfactant is selected from the group consisting of acetylenic glycol based surfactants, fluoro-containing surfactants, silicone-containing surfactants, and combinations thereof.

46. The gypsum composition of claim 41, wherein the surfactant is characterized by having the capability of reducing the surface tension of water to about 40 dyne/cm or below.

47. The gypsum composition of claim 41, wherein said composition has a Noise Reduction Coefficient of at least about 0.4, according to ASTM E 1042-92.

48. The gypsum composition of claim 41, wherein the weight ratio of water to calcined gypsum used to prepare the mixture is from about 4.5:1 to about 9:1.

49. The gypsum composition of claim 41, wherein at least 50% by weight of said calcined gypsum is beta calcium sulfate hemihydrate.

50. A set gypsum composition comprising a continuous phase of interlocking set gypsum matrix, the matrix including gypsum and evaporated water voids, wherein the evaporated water voids volume of the matrix is at least about 69% according to the evaporated water voids volume test, and wherein said set gypsum composition is formed from at least water and calcined gypsum comprising at least 30 wt. % of non-fibrous calcined gypsum.

51. The gypsum composition of claim 50, wherein the evaporated water voids volume is from about 74% to about 95% according to the evaporated water voids volume test.

52. The gypsum composition of claim 50, wherein said composition is prepared from a mixture comprising at least water-and calcined gypsum, wherein the weight ratio of water to calcined gypsum used to prepare the mixture is from about 3:1 to about 12:1.

53. The gypsum composition of claim 52, wherein the ratio of water to calcined gypsum used to prepare the mixture is from about 4.5:1 to about 9:1.

54. The gypsum composition of claim 52, wherein the mixture is further prepared using an enhancing material selected from the group consisting of a trimetaphosphate compound, an ammonium polyphosphate having 500–3000 repeating phosphate units, a polycarboxylic compound, a surfactant, and combinations thereof.

55. The gypsum composition of claim 54, wherein the enhancing material is sodium trimetaphosphate or sodium trimetaphosphate and at least one ammonium polyphosphate having 1000–3000 repeating units.

56. The gypsum composition of claim 54, wherein the polycarboxylic compound is a polyacrylate having a molecular weight of from about 200,000 daltons to about 700,000 daltons.

57. The gypsum composition of claim 54, wherein the ammonium polyphosphate has 1000–3000 repeating units.

58. The gypsum composition of claim 54, wherein the surfactant is selected from the group consisting of acetylenic glycol based surfactants, fluoro-containing surfactants, silicone-containing surfactants, and combinations thereof.

59. The gypsum composition of claim 54, wherein the surfactant is characterized by having the capability of reducing the surface tension of water to about 40 dyne/cm or below.

60. The gypsum composition of claim 50, wherein said composition has a Noise Reduction Coefficient of at least about 0.4, according to ASTM E 1042-92.

61. The gypsum composition of claim 52, wherein the ratio of water to calcined gypsum used to prepare the mixture is from about 5:1 to about 8:1.

62. The gypsum composition of claim 50, wherein said composition is further formed from at least one member selected from the group consisting of a starch, a binder, expanded perlite, a reinforcing additive, and air voids formed by an aqueous foam.

63. A set gypsum composition comprising:
a continuous phase of interlocking set gypsum matrix, wherein the matrix includes gypsum and evaporated water voids and wherein the evaporated water voids volume of the matrix is at least about 69% according to the evaporated water voids volume test; and
wherein said set gypsum composition is formed from a mixture comprising calcined gypsum, water, and an enhancing material selected from the group consisting of a trimetaphosphate compound, an ammonium polyphosphate having 500–3000 repeating phosphate units, a polycarboxylic compound, a surfactant, and combinations thereof.

64. The gypsum composition of claim 63, wherein the enhancing material is sodium trimetaphosphate or sodium trimetaphosphate and at least one ammonium polyphosphate having 1000–3000 repeating units.

65. The gypsum composition of claim 63, wherein the polycarboxylic compound is a polyacrylate having a molecular weight of from about 200,000 daltons to about 700,000 daltons.

66. The gypsum composition of claim 63, wherein the ammonium polyphosphate has 1000–3000 repeating units.

67. The gypsum composition of claim 63, wherein the surfactant is selected from the group consisting of acetylenic glycol based surfactants, fluoro-containing surfactants, silicone-containing surfactants, and combinations thereof.

68. The gypsum composition of claim 63, wherein the surfactant is characterized by having the capability of reducing the surface tension of water to about 40 dyne/cm or below.

69. The gypsum composition of claim 63, wherein said composition has a Noise Reduction Coefficient of at least about 0.4, according to ASTM E 1042-92.

70. The gypsum composition of claim 63, wherein said composition further comprises at least one member selected from the group consisting of a starch, a binder, expanded perlite, a reinforcing additive, an aqueous foam, and mixtures thereof.

71. The gypsum composition of claim 63, wherein the composition is prepared from a mixture comprising at least water and calcined gypsum, wherein the weight ratio of water to calcined gypsum used to prepare the mixture is from about 3:1 to about 12:1.

72. The gypsum composition of claim 71, wherein the ratio of water to calcined gypsum used to prepare the mixture is from about 4.5:1 to about 9:1.

73. A set gypsum composition comprising a continuous phase of interlocking set gypsum matrix, wherein the matrix includes gypsum and evaporated water voids, and wherein the evaporated water voids volume of the matrix is at least about 80% according to the evaporated water voids volume test.

74. The gypsum composition of claim 73, wherein the composition is prepared from a mixture comprising water and calcined gypsum, and wherein the weight ratio of water to calcined gypsum used to prepare the mixture is from about 4.5:1 to about 12:1.

75. The gypsum composition of claim 74, wherein the ratio of water to calcined gypsum used to prepare the mixture is from about 4.5:1 to about 9:1.

76. The gypsum composition of claim 74, wherein the mixture is further formed from an enhancing material selected from the group consisting of a trimetaphosphate compound, an ammonium polyphosphate having 500–3000 repeating phosphate units, a polycarboxylic compound, a surfactant, and combinations thereof.

77. The gypsum composition of claim 76, wherein the enhancing material is sodium trimetaphosphate or sodium trimetaphosphate and at least one ammonium polyphosphate having 1000–3000 repeating units.

78. The gypsum composition of claim 76, wherein the polycarboxylic compound is a polyacrylate having a molecular weight of from about 200,000 daltons to about 700,000 daltons.

79. The gypsum composition of claim 76, wherein the ammonium polyphosphate has 1000–3000 repeating units.

80. The gypsum composition of claim 76, wherein the surfactant is selected from the group consisting of acetylenic glycol based surfactants, fluoro-containing surfactants, silicone-containing surfactants, and combinations thereof.

81. The gypsum composition of claim 76, wherein the surfactant is characterized by having the capability of reducing the surface tension of water to about 40 dyne/cm or below.

82. The gypsum composition of claim 73, wherein said composition has a Noise Reduction Coefficient of at least about 0.4, according to ASTM E 1042-92.

83. The gypsum composition of claim 74, wherein the ratio of water to calcined gypsum used to prepare the mixture is from about 5:1 to about 8:1.

84. The gypsum composition of claim 73, wherein said composition is further formed from at least one member selected from the group consisting of a starch, a binder, expanded perlite, a reinforcing additive, an aqueous foam, and mixtures thereof.

85. A method of preparing a set gypsum composition comprising:
preparing a mixture formed from at least calcined gypsum and water, wherein the ratio of water to calcined gypsum used to prepare the mixture is at least about 4.5:1; and
maintaining the mixture under conditions sufficient for the calcined gypsum to form a set gypsum matrix.

86. A method of preparing a set gypsum composition comprising:
preparing a mixture formed from at least calcined gypsum and water, wherein at least 30 wt. % of said calcined gypsum is non-fibrous calcined gypsum, and the ratio of water to calcined gypsum used to prepare the mixture is at least about 3:1; and
maintaining the mixture under conditions sufficient for the calcined gypsum to form a set gypsum matrix.

87. A method of preparing a set gypsum composition comprising:
preparing a mixture formed from at least calcined gypsum, water, and an enhancing material selected from the group consisting of a trimetaphosphate compound, an ammonium polyphosphate having 500–3000 repeating phosphate units, a polycarboxylic compound, a surfactant, and combinations thereof, and wherein the ratio of water to calcined gypsum used to prepare the mixture is at least about 3:1; and
maintaining the mixture under conditions sufficient for the calcined gypsum to form a set gypsum matrix.

88. A set gypsum composition comprising a continuous phase of interlocking set gypsum matrix, wherein the matrix includes gypsum, a trimetaphosphate compound, and evaporated water voids, and wherein the evaporated water voids volume of the matrix is at least about 69% according to the evaporated water voids volume test.

* * * * *